US009238229B1

(12) United States Patent
Kempf et al.

(10) Patent No.: US 9,238,229 B1
(45) Date of Patent: Jan. 19, 2016

(54) VARIABLE CONVEYOR

(75) Inventors: Richard P. Kempf, Crystal Lake, IL (US); Thomas P. Musschoot, Marengo, IL (US); Daniel T. Lease, Spring Grove, IL (US)

(73) Assignee: General Kinematics Corporation, Crystal Lake, IL (US)

( * ) Notice: Subject to any disclaimer, the term of this patent is extended or adjusted under 35 U.S.C. 154(b) by 833 days.

(21) Appl. No.: 13/362,881

(22) Filed: Jan. 31, 2012

Related U.S. Application Data

(60) Provisional application No. 61/437,897, filed on Jan. 31, 2011.

(51) Int. Cl.
*G06F 7/00* (2006.01)
*B02C 25/00* (2006.01)
*B02C 19/16* (2006.01)

(52) U.S. Cl.
CPC ............... *B02C 25/00* (2013.01); *B02C 19/16* (2013.01)

(58) Field of Classification Search
None
See application file for complete search history.

(56) References Cited

U.S. PATENT DOCUMENTS

| | | |
|---|---|---|
| 3,358,815 A | 12/1967 | Musschoot et al. |
| 3,712,459 A | 1/1973 | Musschoot et al. |
| 3,793,780 A | 2/1974 | Musschoot |
| 4,025,419 A | 5/1977 | Musschoot |
| 4,152,255 A | 5/1979 | Musschoot |
| 4,168,774 A | 9/1979 | Musschoot |
| 4,196,637 A | 4/1980 | Barrot et al. |
| 4,415,444 A | 11/1983 | Guptail |
| 4,452,016 A * | 6/1984 | Majors .................. B24B 31/073 451/327 |
| 4,495,826 A | 1/1985 | Musschoot |
| 4,617,832 A * | 10/1986 | Musschoot ............. B06B 1/162 198/770 |
| 5,024,320 A | 6/1991 | Musschoot |
| 5,054,606 A | 10/1991 | Musschoot |
| 5,064,053 A | 11/1991 | Baker |
| 5,131,525 A | 7/1992 | Musschoot |
| 5,178,259 A * | 1/1993 | Musschoot ............. B65G 27/32 198/753 |
| 5,615,763 A | 4/1997 | Schieber |
| 5,666,852 A | 9/1997 | Musschoot |
| 6,145,652 A | 11/2000 | Durnil |
| 6,155,404 A | 12/2000 | Musschoot |
| 6,269,940 B1 | 8/2001 | Rosenstrom |
| 6,598,734 B1 | 7/2003 | Rosenstrom |
| 6,680,591 B1 | 1/2004 | Knutson et al. |
| 7,240,800 B2 | 7/2007 | Musschoot et al. |
| 7,712,513 B1 | 5/2010 | Mitchell, III |

(Continued)

FOREIGN PATENT DOCUMENTS

| | | | |
|---|---|---|---|
| DE | 972488 | * | 11/1959 |
| DE | 972488 A | * | 11/1959 |
| EP | 0683119 | | 11/1995 |

(Continued)

*Primary Examiner* — Yolanda Cumbess
(74) *Attorney, Agent, or Firm* — Cook Alex Ltd.

(57) ABSTRACT

A vibratory apparatus includes a trough having a first end and a second end, and at least first and second variable amplitude vibration generators coupled to the trough. The first and second variable amplitude vibration generators include at least one variable eccentric weight assembly having a variable center of mass relative to an axis of rotation. The first and second variable amplitude vibration generators have at least a first state wherein an amplitude of a vibratory force generated by the first vibration generator is different than an amplitude of a vibratory force generated by the second vibration generator to cause movement of material in the trough toward the first end or the second end.

18 Claims, 3 Drawing Sheets

(56) References Cited

U.S. PATENT DOCUMENTS 7,735,653 B2 6/2010 Musschoot et al.
8,096,406 B1 1/2012 Mitchell, III

FOREIGN PATENT DOCUMENTS

| EP | 0683119 A1 | * | 11/1995 | ............. B65G 27/32 |
| EP | 683119 A1 | * | 11/1995 | ............. B65G 27/32 |

* cited by examiner

VARIABLE CONVEYOR

The present application claims benefit of U.S. Provisional Application No. 61/437,897, filed on Jan. 31, 2011, the disclosure of which is hereby incorporated by reference in its entirety.

BACKGROUND

This patent is directed to system and method for conveying or moving workpieces and material, and in particular to a system and method for conveying or moving workpieces and material providing a variable manner of conveyance.

SUMMARY

According to an aspect of the present disclosure, a vibratory apparatus includes a trough having a first end and a second end, and at least first and second variable amplitude vibration generators coupled to the trough. The first and second variable amplitude vibration generators include at least one variable eccentric weight assembly having a variable center of mass relative to an axis of rotation. The first and second variable amplitude vibration generators have at least a first state wherein an amplitude of a vibratory force generated by the first vibration generator is different than an amplitude of a vibratory force generated by the second vibration generator to cause movement of material in the trough toward the first end or the second end.

BRIEF DESCRIPTION OF THE DRAWINGS

It is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings is necessarily to scale.

DETAILED DESCRIPTION OF VARIOUS EMBODIMENTS

Although the following text sets forth a detailed description of different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Furthermore, while a certain spatial conventions have been adopted for purposes of illustration, these conventions are not necessarily intended to limit the installation of the system according to the present disclosure. Consequently, terms such as up and down, upstream and downstream, and inner and outer, are simply to facilitate the discussion of the illustrated embodiment as it is shown in the attached drawings.

Figure 1:
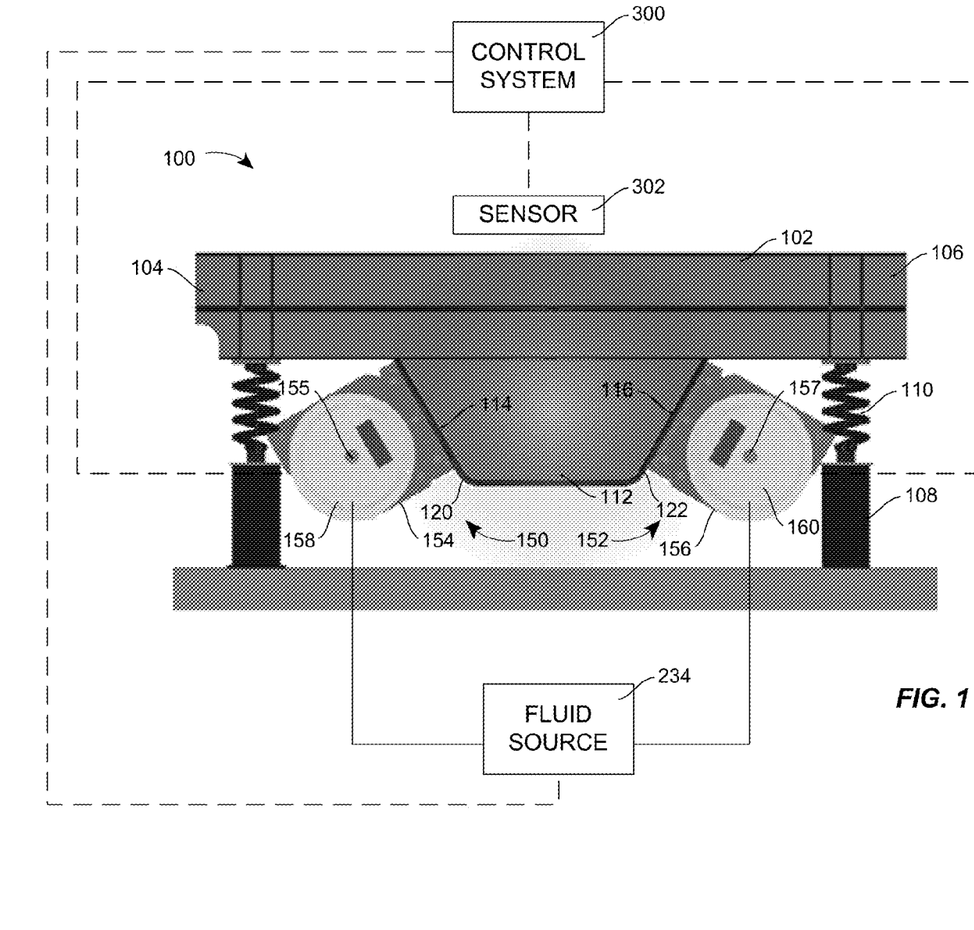
FIG. 1 is a side elevation view of a feeder according to the present disclosure utilizing a plurality of variable amplitude vibration generators to provide a variable manner of conveyance.

FIG. 1 illustrates an embodiment of a vibratory apparatus 100 including a trough 102. The trough 102 may have a bottom wall and opposing side walls, one of which is visible in FIG. 1, although according to certain embodiments the trough 102 may lack either or both of the side walls. In addition, the trough 102 according to certain embodiments may be closed-top while the illustrated embodiment is open-top. The trough 102 may also have a first end 104 and a second end 106. According to certain embodiments of the apparatus 100 discussed herein, the apparatus 100 may be operated so as to move material disposed in the trough 102 in the direction of the first end 104 or the second end 106, such that either end may be the inlet or the outlet end of the apparatus 100. The apparatus 100 may thus be described as bi-directional according to the illustrated embodiment, although it will also be recognized that the variation of the manner of conveyance described herein does not require that the apparatus be operated as a bi-directional apparatus, but instead will work equally well if the first end 104 is a dedicated inlet end and the second end 106 is a dedicated outlet end, or vice versa.

As illustrated, the apparatus 100 also includes a frame 108 disposed on the ground. Resilient members 110, such as in the form of coil springs, may be disposed between the trough 102 and the frame 108. The resilient members 110 may act as isolation springs in accordance with the illustrated embodiment, wherein the apparatus 100 is configured as a feeder. It will be recognized that while a particular configuration (e.g., feeder) has been illustrated for the apparatus 100, this configuration is intended to be merely exemplary and non-limiting, and the term "conveyor" is used in reference herein to the embodiment illustrated as well as other embodiments wherein workpieces or materials are conveyed or moved.

A mount 112 may be disposed below the trough 102, and in particular below the bottom wall of the trough 102. The mount 112 may include one or more plates that are attached together, and then attached to the bottom wall of the trough 102. Alternatively, the mount 112 may include, at least in part, the side walls of the trough 102 or extensions thereof. The mount 112 may have a first end 114 that is disposed along the trough 102 in the direction of the first end 104 of the trough 102, and a second end 116 that is disposed along the trough 102 in the direction of the second end 106 of the trough 102. The first and second ends 114, 116 have surfaces 120, 122 for mounting vibration generators 150, 152, such that the generators 150, 152 are coupled to the trough 102.

Each of the vibration generators 150, 152 is a variable amplitude vibration generator according to the present disclosure. In particular, each of the vibration generators 150, 152 includes an electric motor 154, 156 with a shaft 155, 157 and at least one variable eccentric weight assembly 158, 160 attached to the shaft 155, 157 and having a variable center of mass relative to an axis of rotation (e.g., the axis of rotation of the shafts 155, 157). According to certain embodiments, each vibration generator 150, 152 may include two eccentric weigh assemblies, with one attached to one end of the shafts 155, 157 and the other attached to the opposite ends of the shafts 155, 157.

The variable eccentric weight assemblies 158, 160 of the variable amplitude vibration generators 150, 152 may be of the type shown in U.S. Pat. No. 3,358,815 or 4,617,832, both of which are incorporated in their entirety for all purposes herein, although other embodiments are possible. These vibration generators may permit the degree of eccentric force generated with rotation of the weight assembly to be varied between zero and maximum, as discussed in greater detail below with reference to embodiments in FIGS. 2-5.

The eccentric weight assembly illustrated in FIGS. 2-5 is an embodiment of an eccentric weight assembly that may be used for either variable amplitude vibration generator 150, 152, or both according to certain embodiments. The assembly includes a static weight (i.e., having a fixed relationship to a point of reference, e.g., a shaft) and a moveable weight (i.e., moveable relative to the point of reference, e.g., the shaft), the moveable weight being capable of being disposed at various radial positions along a cylinder that is directed along a diameter of the assembly. By varying the position of the moveable weight within the cylinder relative to the fixed weight, an eccentric force with varying amplitude may be generated. The position of the moveable weight may be varied by providing various pressures within a portion of the cylinder, referred to as the chamber. As illustrated, the position of the movable weight with respect to the fixed weight is reversible so that in one configuration (FIGS. 2 and 3) 0 psi pressure in the chamber produces a zero unbalanced force, and in the other configuration (FIGS. 4 and 5) 0 psi pressure in the chamber produces a maximum unbalanced force.

Figure 2:
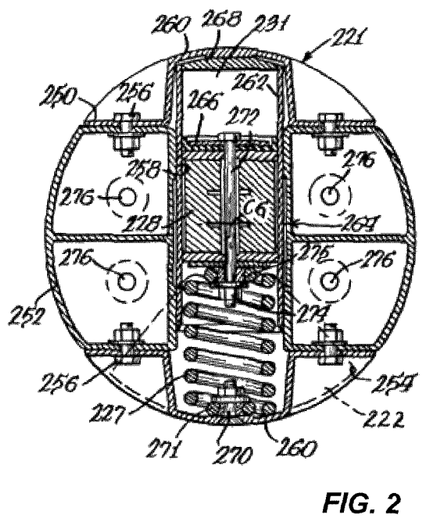
FIG. 2 is a cross-sectional view of an eccentric weight assembly for use in a variable amplitude vibration generator according to the present disclosure in a first configuration.
Figure 3:
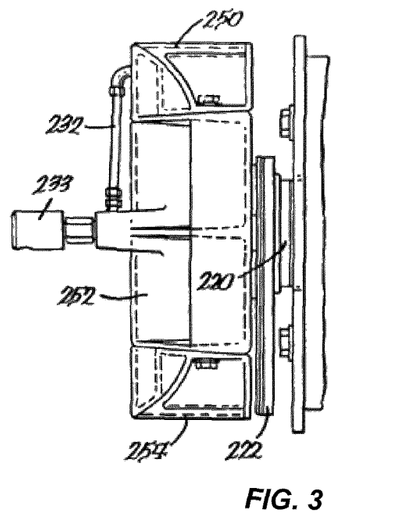
FIG. 3 is a side elevation view of the eccentric weight assembly according to FIG. 2.

Referring first to FIGS. 2 and 3, it will be recognized that an assembly 221 includes three parts 250, 252, 254, with the end parts 250 and 254 being mirror images of each other and being interchangeably bolted by bolts 256 to the center part 252. The center part 252 has an axial bore 258 aligned with blind humps 260 on the end parts 250, 254. A cylindrically shaped sleeve 262 forming a cylinder or carrier 264 is fitted and secured in the axial bore 258 and extends on one end into the hump 260 on end part 250. A movable weight 228 is slidably disposed in the cylinder 264 and has a piston 266 attached thereto on the closed end 268 of the cylinder to define a pressure chamber 231 between the piston 266 and the end 268 of the cylinder 264.

A coil spring 227 is secured to the hump 260 of the end part 254 by bolt and nut 270 securing one pigtail end 271 of the spring to the end part 254. The other end of the spring 227 is secured to the movable weight 228 and piston 266 by a through bolt 272 and nut 274 passing through the pigtail 275 on the other end of the spring 227.

The assembly 221 is driven by a motor shaft 220 (see FIG. 3, which may correspond to the shafts 155, 157 illustrated in FIG. 1), which may carry a duplicate assembly on the other end of said shaft, as disclosed above. The assembly 221 is bolted by bolts 276 to a fixed weight 222 which weight in turn is affixed to the motor shaft 220. The fixed weight 222 has a center of gravity outboard (or below in FIG. 3) of the axis of rotation of the shaft. The carrier or cylinder 262 has a longitudinal axis that lies in a plane that passes through the center of gravity of the fixed weight 222 and through the axis of rotation of the shaft 220.

A fluid pressure line 232 connects at one end to the pressure chamber 231 and at its other end to a rotatable connector 233. A fluid pressure line connects the connector 233 to a source 234 of fluid under pressure (see FIG. 1). The fluid can be air, hydraulic or pneumatic.

In the static state of FIGS. 2 and 3 the center of gravity of the fixed weight 222 is below the rotational axis of the shaft 220 and the spring 227 positions the center of gravity of the movable weight 228 on the opposite side of the rotational axis of the shaft 220. According to the operating principle of the assembly 221 of FIGS. 2 and 3, at rated speed of rotation and 0 pounds of pressure in the chamber 231, the movable weight 228 will be balanced by the tensioning spring force and by the fixed weight 222 so that no vibratory forces are generated. At maximum pressure in the chamber 231, the movable weight 228 will move against the compression of the spring 227 and produce maximum vibratory forces.

Figure 4:
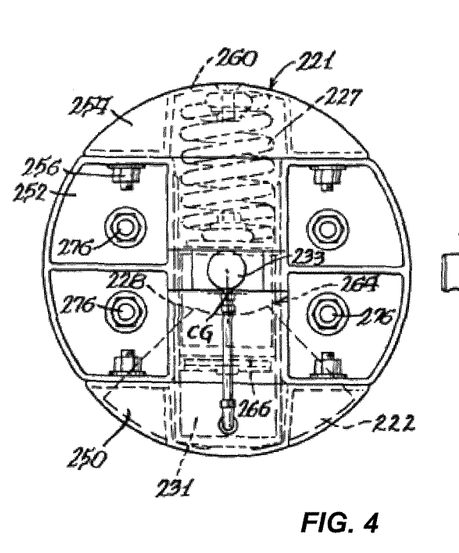
FIG. 4 is a cross-sectional view of an eccentric weight assembly for use in a variable amplitude vibration generator according to the present disclosure in a second configuration.
Figure 5:
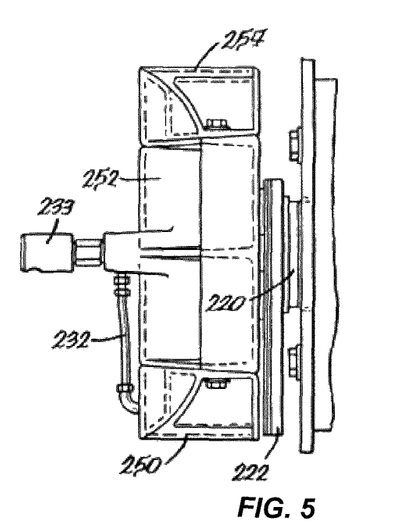
FIG. 5 is a side elevation view of the eccentric weight assembly according to FIG. 4.

Unbolting bolts 276 and rotating the assembly 221 relative to the fixed weight 222 by 180 degrees and reinserting and rebolting the assembly 221 to the fixed weight 222 will result in the structure of FIGS. 4 and 5 wherein the center of gravity of the movable weight 228 is on the same side of the axis of rotation of the shaft 220 as is the center of gravity of the fixed weight 222. The operational result is that at 0 pounds pressure and rated speed of rotation, maximum vibratory forces are generated, and at maximum applied pressure in chamber 231, the vibratory forces generated will be 0.

While it is convenient to use the eccentric weight assembly of FIGS. 2-5 for assemblies 158, 160, because the assembly is capable of operating in either of the two alternative ways by merely reorienting the assembly 221 relative to the fixed weight 222 by 180 degrees, this should not be taken as limiting the assemblies 158, 160 to this particular embodiment. It should be noted, however, that it is especially advantageous to use a coil spring in the assembly of FIGS. 2-5 because the deflection of a coil spring in either tension or compression is directly proportional to the force, i.e., is in linear relationship.

This linear relationship contributes to the ease and accuracy of control of the vibratory force produced by the assembly 221.

Returning then to FIG. 1, it will be recognized that each of the variable amplitude vibration generators 150, 152 is positioned on an opposite side of the center of gravity of the trough 102, and more generally the apparatus 100. As illustrated, one of the vibration generators 150, 152 is positioned below the trough 102 and horizontally displaced in one direction (i.e., towards the first end 104) from the center of gravity of the trough 102, while the other of the vibration generators 150, 152 is positioned below and equally horizontally displaced in the opposite direction (i.e., towards the second end 106) from the center of gravity of the trough 102. As such, the vibration generator 150 is located along a first line making an acute angle with the horizontal, the first line passing through the center of gravity of the trough 102, while the vibration generator 152 is located along a second line making an obtuse angle with the horizontal, the second line also passing through said center of gravity of the trough 102. Moreover, the generators 150, 152 are attached directed to the mount 112, thus defining a brute force system in this exemplary embodiment.

The vibration generators 150, 152 (and in particular the motors 154, 156) are operatively coupled (through a cable or harness, for example) to a controller 300. The controller 300 is also operatively coupled to the fluid source 234 that is connected to the eccentric weight assemblies 158, 160 (or more particularly, one or more valves that connect the fluid source 234 to the assemblies 158, 160). The controller 300 is programmed to operate the eccentric weight assemblies 158, 160 to vary the amplitude of the vibratory force provided by the individual vibration generators 150, 152. In particular, the operation of the eccentric weigh assemblies 158, 160 may be controlled by the controller 300 so as to vary the manner of conveyance of the motion of the material moving along the trough 102 between the ends 104, 106, as will be explained in greater detail relative to the illustrations of FIGS. 6-10.

Figure 6:
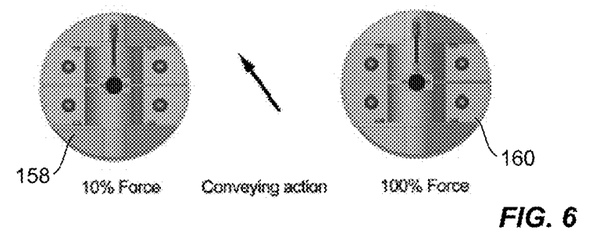
FIG. 6 is a schematic view of a first state for the variable amplitude vibration generators according the present disclosure and the resulting manner of conveyance.

Beginning at FIG. 6, it will be recognized that a first state is illustrated therein for the generators 150, 152, and in particular for the assemblies 158, 160. In the first state, the generators 150, 152 apply unequal (or different) forces (in terms of amplitude) to the trough 102 because of different states of operation of the eccentric weigh assemblies 158, 160. In particular, the eccentric weight assembly 158 is operated by the controller 300 to provide a force that is substantially less than the maximum possible force (for example, 10% of the maximum possible force). On the other hand, the eccentric weight assembly 160 is operated by the controller 300 to provide a force that is approximately the same as the maximum possible force. These operational states may be achieved by operating the assembly 158 with a very low pressure in the chamber of the assembly, while operating the assembly 160 with maximum pressure in the chamber of the assembly, assuming that the assemblies are similar to and configured as illustrated in FIGS. 2 and 3. As illustrated, the consequence is that the manner of conveyance is generally in the direction of the first end 104 of the trough 102, causing material or workpieces on the trough to move toward the first end 104. It will be recognized that while a particular line defining a particular angle with the horizontal is provided to schematically represent the direction of the motion of material or workpieces disposed on the trough 102, the actual motion of the trough 102 is more generally in the nature of an elliptical (including potentially circular) motion; however, the arrow is included to illustrate the predominant direction of material disposed on the trough 102.

It will be recognized that while the first state illustrated in FIG. 6 is achieved by operating one of the assemblies 158, 160 to provide maximum force and the other assembly 158, 160 to provide a fraction of maximum force, it is also possible to cause conveyance in the direction of the first end of the trough 102 by providing any two unequal forces wherein the force provided by the assembly 158 is less than the force provided by the assembly 160. Additionally, it will be recognized that the manner of conveyance will be shallower (i.e., closer to horizontal movement) the greater difference between the force produced by the generator 150 and the force produced by the generator 152.

Figure 7:
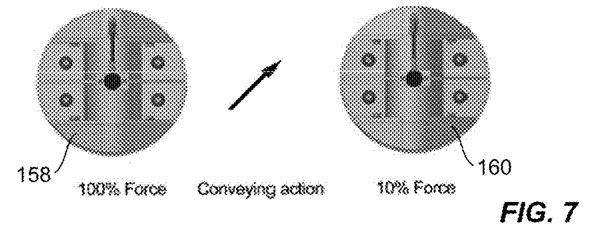
FIG. 7 is a schematic view of a second state for the variable amplitude vibration generators according the present disclosure and the resulting manner of conveyance.

FIG. 7 illustrates that according to certain embodiments of the present disclosure, it may also be possible to operate the assemblies 158, 160 to generate conveyance opposite to that generated in FIG. 7. That is, the manner of conveyance generated in a second state illustrated in FIG. 7 is in the direction of the second end 106 of the trough, as opposed to the first end 104 of the trough 102, and the material or workpieces on the trough 102 will move toward the second end 106. Like the first state illustrated in FIG. 6, the second state illustrated in FIG. 7 is achieved by operating one of the assemblies (assembly 158) at maximum force, while operating the other assembly (assembly 160) at a fraction (e.g., 10%) of the maximum force possible. It will be recognized that the comments made above relative to the generation of the manner of conveyance in the first state apply equally to the generation of the manner of conveyance in the second state, as relates to the size and difference of the forces generated by the assemblies 158, 160, for example.

Figure 8:
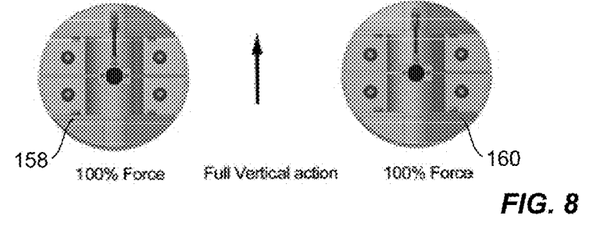
FIG. 8 is a schematic view of a third state for the variable amplitude vibration generators according the present disclosure and the resulting manner of conveyance.

A third state of operation is illustrated in FIG. 8. In this state, the first and second assemblies 158, 160 are both operated to provide the maximum force. For example, as discussed with reference to the arrangement illustrated in FIGS. 2 and 3, this third state may correspond to maximum pressure being provided to the chamber 231, such that the maximum vibratory forces are generated and applied to the trough 120. When both assemblies 158, 160 are operated with equal force, the direction of vibration of the trough 102 will be vertical (i.e., 90 degrees relative to horizontal), as determined by bisecting the angle formed by the intersection of first and second lines discussed above.

Figure 9:
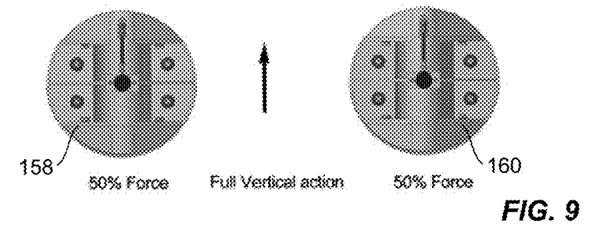
FIG. 9 is a schematic view of a fourth state for the variable amplitude vibration generators according the present disclosure and the resulting manner of conveyance.

It will be recognized that a full vertical action may be provided without operating both assemblies 158, 160 so as to provide maximum force. As illustrated in FIG. 9, the first and second assemblies 158, 160 are each operated to provide approximately half of the maximum force (amplitude) possible from each assembly 158, 160 in a fourth state. Because the assemblies 158, 160 are still operated with equal force, such as in the third state, the direction of the vibration of the trough 102 will be vertical (i.e., 90 degrees relative to horizontal). However, because the force provided by each assembly 158, 160 is only half of the maximum possible force, the amplitude of the force applied to the trough 102 will be approximately half that of the force applied to the trough 102 in the third state. In the general case, wherein the force provided by each assembly 158, 160 is equal, but different than that provided in the third state, then the amplitude of the force applied to the trough 102 will be different than that applied to the trough 102 in the third state.

It will also be recognized that a reduction in force applied to the trough 102 could be achieved by changing the speed at which the controller 300 operates each of the motors 154, 156. However, while the controller 300 may be programmed to perform a change in the speed of each of the motors 154, 156, it will be recognized that the apparatus 100 according to the present disclosure may more advantageously provide a change in force applied to the trough 102 without resort to changing the speed of the motors 154, 156. As a consequence, the motors 154, 156 may be operated under the control of the controller 300 so as to optimize the performance of the motors 154, 156. For example, the motors 154, 156 may be operated at a constant (within a given operational range) and equal speed regardless of the force to be applied to the trough 102.

In fact, synchronization will occur naturally relative to the motors 154, 156 without any electronic control required to monitor or adjust motor speed. This self-synchronization is believed to occur even when changing between states, such as between the states illustrated in FIGS. 6-9. However, some period of time may be required for self-synchronization to occur at start-up and when the assemblies 158, 160 are operated to provide zero vibratory forces, as explained in greater detail with reference to FIG. 10, below.

Figure 10:
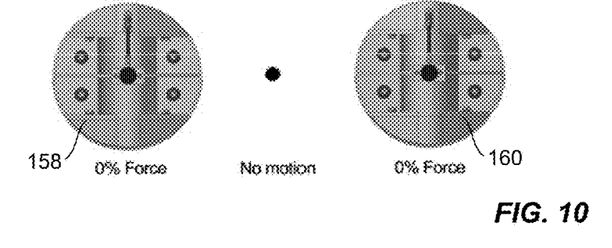
FIG. 10 is a schematic view of a fifth state for the variable amplitude vibration generators according the present disclosure and the resulting manner of conveyance.

FIG. 10 illustrates a fifth state, wherein both of the generators 150, 152 provide no vibratory force. This may be achieved while operating the motors 154, 156 at a constant speed (rpm) by changing the operation of the assemblies 158, 160 to provide zero vibratory force. Assuming that the assemblies 158, 160 are as illustrated in FIGS. 2 and 3, this may achieved by providing no pressure to the chambers associated with the assemblies 158, 160. As a consequence, there is no conveyance, which is not to suggest that the conveyance is horizontal. Instead, the material or workpieces in the trough 102 would not move at all.

It will be recognized that other than the fifth state described above, the relationship between the operation of the generators 150, 152 and the manner of conveyance is dependent upon the positioning of the generators 150, 152 relative to the trough 102, and more particularly the surface of the trough 102. That is, if the vibration generators are positioned not on opposite sides of the center of mass of the apparatus 100 (through 102) as well as at opposing angles, as illustrated, then the conveyance will be different from that illustrated in FIGS. 6-9. However, it will be understood that there may still be a first state wherein the generators 150, 152 provide nearly vertical action, while in other states the generators may provide at least conveyance that moves the material or workpieces disposed on the trough 102 in the direction of one of the first and second ends 104, 106 of the trough 102.

Moreover, while the embodiments illustrated herein utilize two vibratory generators with two motors, it will be recognized that other configurations are possible. For example, the eccentric weight assemblies 158, 160 may be on two shafts, which shafts are operatively connected to a single motor, rather than the eccentric weight assemblies 158, 160 being associated with different motors. For that matter, it may be possible to use additional motors and additional eccentric weight assemblies, while remaining within the scope of the present disclosure. For example, one may envision an embodiment where the first and second vibration generators 150, 152 are used to provide non-vertical conveyance, and a third generator (or even a pair of third and fourth generators) is used to provide vertical conveyance while the eccentric weight assemblies for the first and second vibration generators are operated such that these generators provide no vibratory force.

An apparatus 100 according to the present disclosure may be used as a shakeout, for example. That is, given that the apparatus 100 may be controlled to provide both vertical and non-vertical conveyance, the apparatus 100 may be used to provide a non-vertical conveyance to move a workpiece (e.g., a casting or a casting with mold) along the trough 102 to a central position on the trough, to change the manner of conveyance to vertical conveyance to shake the mold sand and resin off of the casting, and then to change to non-vertical conveyance (which may or may not be the same as non-vertical manner of conveyance used initially) to move the casting along and off of the trough 102. In particular, the controller 300 may be programmed to carry out such a series of changes, and may be programmed to repeatedly cycle between these states or any of the states described above. However, the apparatus 100, as well as the drive including the vibration generators 150, 152, fluid source 234 and controller 300, may be utilized on a variety of vibratory devices and in a variety of applications, including foundry, recycling, process, scrap, and mining applications.

In addition, while the five states described above with reference to FIGS. 6-10 were each described in terms of a discrete state, it will be recognized that the transition may be nearly continuous from one state to the next. For that matter, while the controller 300 may be programmed to change or proceed from one state to another in an ordered fashion, such as might be used for a continuous process with the apparatus 100 installed as part of a larger system or line, it is also possible to use the apparatus 100 separate and apart from other equipment. According to this latter application, it may be necessary to change between the states in real time or near real time. The apparatus according to the present disclosure may permit the operator to change in a continuous fashion between one state and another without ceasing the operation of the motors 154, 156 or the operation being carried out on the material or workpiece disposed in the trough 102 (e.g., conveyance, shake-out, separation, etc.), literally on-the-fly. In a similar fashion, the controller 300 may provide changes in the operation of the generators 150, 152 in response to a sensed condition of the apparatus 100, the material or workpieces in the trough 102, or both, in accordance with a signal from a sensor 302, for example, associated with the apparatus 100.

In fact, in this latter case, where the controller 300 is used in combination with one or more sensors 302, the controller 300 may be programmed to operate according to a closed loop control method with reference to a signal received from the sensor 302, such as to hold a desired manner of conveyance.

That is, it will be recognized that the generators 150, 152 (and in particular the assemblies 158, 160) may be operated to provide an expected manner of conveyance according to a set of correspondences between the states of the generators 150, 152 (and assemblies 158, 160) and manner of conveyance as established through prior testing and/or observation. This set of correspondences may be established in table form, and when a user inputs a desired manner of conveyance, the controller 300 references the table (with or without performance an interpolation or extrapolation of the data in the table, as desired) and operates the generators 150, 152 accordingly. However, according to such an open loop control method, the controller 300 is ignorant of the actual manner of conveyance produced.

By providing the sensor 302 and operatively coupling the sensor 302 to the controller 300, the controller 300 may determine the actual generated manner of conveyance through observation, and further control the operation of the assemblies 158, 160 according to a closed loop control method to further ensure correspondence between the user input and the operation of the apparatus 100. For example, the sensor 302 may be a pair of accelerometers attached to the trough 102 in such a fashion that the accelerometers may be oriented to determine a vertical component of the motion of the trough and a horizontal component of the motion of the trough (e.g., one accelerometer may be disposed along the vertical axis and one accelerometer may be disposed along the horizontal axis). The readings may thus be used to calculate an actual manner of conveyance, which the controller 300 may then use to operate one of the states described above according to a closed loop control method with reference to the actual manner of conveyance.

It will also be recognized, however, that the closed loop control system need not be limited to closed loop control as to the manner of conveyance alone. In addition or instead of closed loop control of the manner of conveyance, a closed loop control system may be used to optimize a condition of the processing occurring to the material or workpiece in the trough 102. For example, a video sensor (e.g., a camera) may be used to determine the amount of sand remaining on a casting moving along the trough 102. Alternatively, the temperature sensor (e.g., a thermocouple) may be used to determine the temperature of a bed of heated material moving along the trough 102. According to the feedback signal provided by the sensor 302, the controller 300 may vary the operation of the vibration generators 150, 152 to increase or decrease the conveyance, to increase or decrease the vibratory force applied to the trough, or even to cease motion altogether. Consequently, a wide variety of closed loop control options may be implemented using the apparatus 100 according to the present disclosure.

It will be recognized that the system according to the present disclosure may present one or more advantages relative to prior systems. For example, certain prior systems operate by changing motor speed to attempt to provide a particular manner of conveyance, which changes in motor speed may need to occur almost continuously even to maintain a single manner of conveyance and which may be detrimental to motor performance over time. An apparatus according to the present disclosure may provide a variety of manners of conveyance without requiring any changes in speed of the motors associated with the eccentric weight assemblies. In fact, unlike these prior systems, the system according to the present disclosure does not require a change in motor speed to provide a change in force, but may vary the vibratory force applied without changing the speed of the motors associated with the eccentric weight assemblies. Further, certain prior systems require a complicated system of control and monitoring and/or variable frequency motor drives to maintain a difference between the phase angles of the eccentric weights associated with various motors or shafts, or complicated mechanical mechanisms to coordinate the motion of the various motors or shafts. The apparatus according to the present disclosure does not require any closed loop control or monitoring of the operation of the motors or shafts nor complicated mechanical synchronization equipment, because the system and method can instead rely upon the natural self-synchronization of the motors, while still providing a variety of manners of conveyance. However, the apparatus still provides an opportunity to utilize closed loop control methods to ensure that the desired manner of conveyance associated with the user's input is provided by the vibratory generators associated with the apparatus. According to any particular embodiment of the present system, any or all of these advantages may be present.

What is claimed is:

1. A vibratory apparatus comprising:
    a trough having a first end and a second end;
    at least first and second variable amplitude vibration generators coupled to the trough, the first and second variable amplitude vibration generators comprising at least one variable eccentric weight assembly having a variable center of mass relative to an axis of rotation,
    the first and second variable amplitude vibration generators having a first state wherein an amplitude of a vibratory force generated by the first vibration generator is different than an amplitude of a vibratory force generated by the second vibration generator to cause movement of material in the trough toward the first end or the second end,
    the first and second variable amplitude vibration generators having a second state wherein an amplitude of a vibratory force generated by the first vibration generator is different than an amplitude of a vibratory force generated by the second vibration generator to cause movement of material in the trough toward the first end or the second end in an opposite direction along the trough relative to the first state;
    a controller operatively coupled to the first and second vibration generators, the controller programmed to change the first and second vibration generators between the first and second states; and
    a sensor operatively coupled to the controller, the sensor comprising at least one accelerometer,
    the controller programmed to determine an actual manner of conveyance according to a signal received from the at least one accelerometer and to operate at least one of the first and second states according to a closed loop control method with reference to the actual manner of conveyance.

2. The vibratory apparatus according to claim 1, wherein the controller is programmed to repeatedly cycle between the first and second states.

3. The vibratory apparatus according to claim 1, wherein the first and second variable amplitude vibration generators have a third state wherein an amplitude of a vibratory force generated by the first vibration generator and an amplitude of a vibratory force generated by the second vibration generator is zero.

4. The vibratory apparatus according to claim 1, wherein a speed of rotation of the at least one variable eccentric weight assembly of the first variable amplitude vibration generator is equal to a speed of rotation of the at least one variable eccentric weight assembly of second variable amplitude vibration generator.

5. The vibratory apparatus according to claim 1, wherein the first and second eccentric weight assemblies each comprise a first weight having a fixed relationship to a shaft and a second weight moveable relative to the shaft.

6. The vibratory apparatus according to claim 5, wherein the first and second weights have a first state wherein the weights are disposed such that no vibratory force is generated by the eccentric weight assembly, and a second state wherein the weights are disposed such that a maximum vibratory force is generated by the eccentric weight assembly.

7. The vibratory apparatus according to claim 6, comprising a fluid supply operatively coupled to at least one of the first and second eccentric weight assemblies to move the second weight between the first state and the second state.

8. The vibratory apparatus according to claim 5, wherein the first and second vibration generators each comprise a motor with a motor shaft, the first weight of the first and second eccentric weight assemblies having a fixed relationship to the respective motor shaft and the second weight of the first and second eccentric weight assemblies moveable relative to the respective motor shaft.

9. A vibratory apparatus comprising:
    a trough having a first end and a second end;
    at least first and second variable amplitude vibration generators coupled to the trough, the first and second variable amplitude vibration generators comprising at least one variable eccentric weight assembly having a variable center of mass relative to an axis of rotation, the first and second variable amplitude vibration generators having a first state wherein an amplitude of a vibratory force generated by the first vibration generator is different than an amplitude of a vibratory force generated by the second vibration generator to cause movement of material in the trough toward the first end or the second end, the first and second variable amplitude vibration generators having a second state wherein an amplitude of a vibratory force generated by the first vibration generator is equal to an amplitude of a vibratory force generated by the second vibration generator to cause movement of material in a vertical direction;

a controller operatively coupled to the first and second vibration generators, the controller programmed to change the first and second vibration generators between the first and second states; and a sensor operatively coupled to the controller, the controller programmed to operate in one of the first and second states according to a closed loop control method with reference to a signal received from the sensor.

10. The vibratory apparatus according to claim 9, wherein the first and second variable amplitude vibration generators having a third state wherein an amplitude of a vibratory force generated by the first vibration generator is equal to an amplitude of a vibratory force generated by the second vibration generator to cause movement of material in a vertical direction, but the amplitude of the vibratory forces generated in the third state is different than the amplitude of the vibratory forces generated in the second state.

11. The vibratory apparatus according to claim 9, wherein the controller is programmed to repeatedly cycle between the first and second states.

12. The vibratory apparatus according to claim 9, wherein the sensor comprises at least one accelerometer, and the controller is programmed to determine an actual manner of conveyance according to a signal received from the at least one accelerometer and to operate at least one of the first and second states according to a closed loop control method with reference to the actual manner of conveyance.

13. The vibratory apparatus according to claim 9, wherein the first and second variable amplitude vibration generators have a third state wherein an amplitude of a vibratory force generated by the first vibration generator and an amplitude of a vibratory force generated by the second vibration generator is zero.

14. The vibratory apparatus according to claim 9, wherein a speed of rotation of the at least one variable eccentric weight assembly of the first variable amplitude vibration generator is equal to a speed of rotation of the at least one variable eccentric weight assembly of second variable amplitude vibration generator.

15. The vibratory apparatus according to claim 9, wherein the first and second eccentric weight assemblies each comprise a first weight having a fixed relationship to a shaft and a second weight moveable relative to the shaft.

16. The vibratory apparatus according to claim 15, wherein the first and second weights have a first state wherein the weights are disposed such that no vibratory force is generated by the eccentric weight assembly, and a second state wherein the weights are disposed such that a maximum vibratory force is generated by the eccentric weight assembly.

17. The vibratory apparatus according to claim 16, comprising a fluid supply operatively coupled to at least one of the first and second eccentric weight assemblies to move the second weight between the first state and the second state.

18. The vibratory apparatus according to claim 15, wherein the first and second vibration generators each comprise a motor with a motor shaft, the first weight of the first and second eccentric weight assemblies having a fixed relationship to the respective motor shaft and the second weight of the first and second eccentric weight assemblies moveable relative to the respective motor shaft.

* * * * *